J. M. COLLINS.
LOW PRESSURE TIRE SIGNAL.
APPLICATION FILED JAN. 31, 1911.

1,010,726.

Patented Dec. 5, 1911.

WITNESSES:
J. B. Bowling
L. E. Noack.

INVENTOR
J. M. Collins
BY Jack A. Schley
ATTORNEY

UNITED STATES PATENT OFFICE.

JOSEPH M. COLLINS, OF GORMAN, TEXAS, ASSIGNOR OF ONE-HALF TO S. E. SNODGRASS, OF GORMAN, TEXAS.

LOW-PRESSURE TIRE-SIGNAL.

1,010,726.  Specification of Letters Patent.  Patented Dec. 5, 1911.

Application filed January 31, 1911. Serial No. 605,692.

*To all whom it may concern:*

Be it known that I, JOSEPH M. COLLINS, citizen of the United States, residing at Gorman, in the county of Eastland and State of Texas, have invented certain new and useful Improvements in Low-Pressure Tire-Signals, of which the following is a specification.

This invention pertains to signals and particularly to an audible signal for pneumatic vehicle tires.

It is a well known fact that accidents in vehicles having pneumatic tires are often due to a low pressure of air in one of the tires, the low pressure causing the tire to become "flat" without the knowledge of the driver. Also in many cases a tire becomes "flat" and the flanges of the rim cut into the tire before the driver is aware of the condition.

It is the object of this invention to provide a device which may be attached to the shell of an ordinary tire valve in place of the usual cap and which device has provision for depressing the deflating-stem of the valve when the pressure in the tire falls below a certain degree thereby permitting the air from the tire to escape into the device and sound an audible signal which will notify the driver of the condition of the tire.

A still further object of the invention is to provide means of the character described that will be strong, durable, efficient, and easy of operation, simple and comparatively inexpensive to construct, and also in which the several parts will not be likely to get out of working order.

Figure 1:
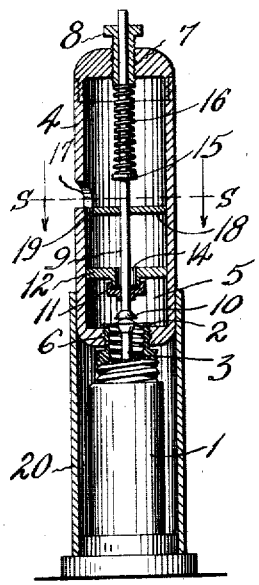
Figure 2:
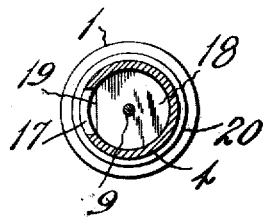

With the above and other objects in view, the invention has relation to certain novel features of construction and operation, an example of which is described in this specification and illustrated in the accompanying drawings, wherein:

Figure 1. is an elevation of an ordinary tire valve with the signal device attached thereto, the device, casing and a portion of the upper end of the valve shell being in section, and Fig. 2. is a horizontal cross section taken on the line S—S of Fig. 1.

In the drawings the numeral 1 designates the shell of an ordinary pneumatic tire valve, 2 the reduced screw threaded upper end and 3, the deflating-stem. These parts are of the usual construction and are shown merely for the purpose of clearly illustrating and describing the invention.

The invention comprises a cylindrical body 4 closed at each end and provided with an elongated interior chamber 5. At its lower end the body has a central screw threaded opening 6 adapted to receive the reduced end 2 of the valve shell. In the upper end of the head a central screw threaded opening 7 is provided and this opening receives a screw threaded adjusting plug 8. A vertical actuating rod 9 passes through the plug and the chamber of the head, being provided at its lower end with a head 10 adapted to engage the upper end of the deflating-stem 3. On the rod a short distance above the head 10 a valve 11 is fixed. This valve is adapted to close upward against the seat of a transverse partition 12 extending across the chamber 5 and suitably secured to the interior walls of the head. The partition completely obstructs the passage of air above the same when the valve 11 is seated. The partition has a central opening 14 through which the rod 9 passes. This opening is somewhat larger in diameter than the rod but smaller than the valve seat so as to be covered by the valve when the latter is seated. A collar 15 is fixed on the rod 9 near its center and supports the lower end of a spring 16 coiled about the rod and bearing at its upper end against the lower end of the plug 8. The parts are so positioned that when the valve 11 is seated the rod 9 will extend downward a sufficient distance to depress the deflating-stem 3 whereby the air under pressure in the tire will pass from the valve shell 1 into the chamber 5 below the partition 12, but beyond which it cannot pass until the valve 11 is unseated.

The plug 8 is adjusted to place the spring 16 under tension. The degree of tension under which the spring is placed is somewhat less than the maximum degree of the pressure of the air in the tire. Thus the valve 11 will be held seated against the tension of the spring 16 until the pressure of the air is reduced to a point where it becomes too low to withstand the tension of the spring or in other words reaches "low pressure". When the spring overcomes the pressure of the air it will extend thereby moving the rod 9 downward, unseating the valve 11 and permitting the air at its minimum pressure to pass through the opening 14. In the side of the head 4 above the partition 12 an opening 17 is provided. Opposite this opening a disk 18 is secured transversely in the chamber 5. Adjacent the opening one edge of the disk is cut off at 19. The opening 17 is shaped the same as the escape opening of an ordinary whistle and the cut off disk 18 occupies the same relation as the plug or diaphragm. The air at minimum pressure passing through the opening 14 will escape between the edge 19 and the edge of the head and through the opening 17 thus producing an audible signal the same as a whistle. This will notify the driver to re-inflate the tire. Of course it is necessary to remove the head when it is desired to inflate the tire and it may be necessary to adjust the plug 8 to prevent the tension of the spring 16 from unseating the valve 11 at a maximum air pressure. A cylindrical casing 20 is fitted about the base of the valve shell 1 and snugly receives at its upper end the lower end of the head 4.

What I claim is:

In a pressure signal device for pneumatic vehicle tires, a body having provision for engagement with a tire valve and provided with a central chamber, the body having an air inlet at its lower end and an air escape opening in its side, a partition fixed in the chamber of the body between the openings thereof and provided with a central opening, a disk fixed in the chamber of the body opposite the escape opening and having a portion cut off, a plug adjustable at the upper end of the head, a central rod passing through the plug, disk and partition and terminating below the latter, a valve mounted on the rod in juxtaposition to the opening of the partition, and a coiled spring supported on the rod in juxtaposition to the plug.

In testimony whereof I have signed my name to this specification in the presence of two subscribing witnesses.

JOSEPH M. COLLINS.

Witnesses:
 JNO. H. SWEART,
 RUTH WALDROP.